United States Patent
Poyak

[11] 3,828,401
[45] Aug. 13, 1974

[54] NON-STAKING CORNER SLUGS FOR JOINING MITRED EXTRUSIONS

[76] Inventor: Steve Poyak, 10 Starr Ave., Danbury, Conn. 06810

[22] Filed: Apr. 6, 1973

[21] Appl. No.: 348,731

[52] U.S. Cl. ................. 24/73 B, 24/243 K, 40/152, 85/11
[51] Int. Cl. ......................... A44b 21/00, F16b 1/00
[58] Field of Search ............. 40/152; 85/15, 13, 11; 24/243 K, 67 CF, 73 B; 403/231

[56] References Cited
UNITED STATES PATENTS

| | | | |
|---|---|---|---|
| 412,981 | 10/1889 | Sanford | 85/11 |
| 1,380,362 | 6/1921 | Cunningham | 85/11 |
| 1,450,513 | 4/1923 | Pearson et al. | 403/231 |
| 2,041,946 | 5/1936 | Nave | 85/11 |
| 3,205,001 | 9/1965 | Abolins | 24/243 K X |
| 3,492,034 | 1/1970 | Skipp | 40/152 UX |

*Primary Examiner*—Donald A. Griffin
*Attorney, Agent, or Firm*—Mattern, Ware & Davis

[57] ABSTRACT

Substantially flat L-shaped corner slugs adapted for insertion in ways formed in mitred extrusions are provided with a raised central bead or ridge arched upwardly. The corner slugs are inserted in the extrusion ways and the mitred extrusions are assembled in their desired final relationship. The beaded corner slugs are then flattened, spreading their edges into swaged deformed interfering relationship with the extruded ways, firmly securing the mitred extrusions in their assembled condition. The corner slugs may be provided with either straight or saw-toothed edges; several different bead cross-sections are contemplated; and the extent of bead flattening is greater at the ends of the corner slugs than at their apices, maximizing the strengthening effect of the bead or rib, at the corner of the assembled mitred extrusion unit.

14 Claims, 15 Drawing Figures

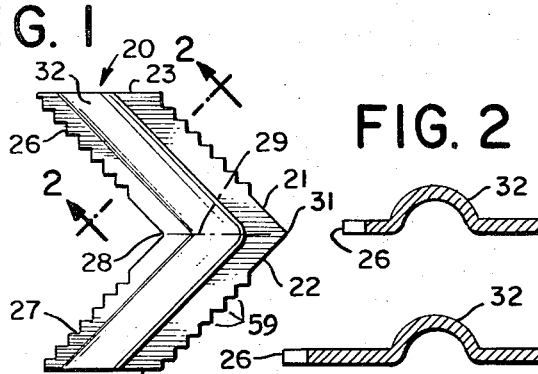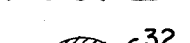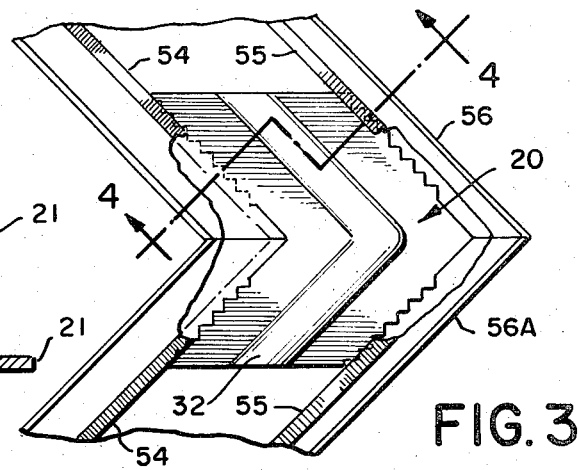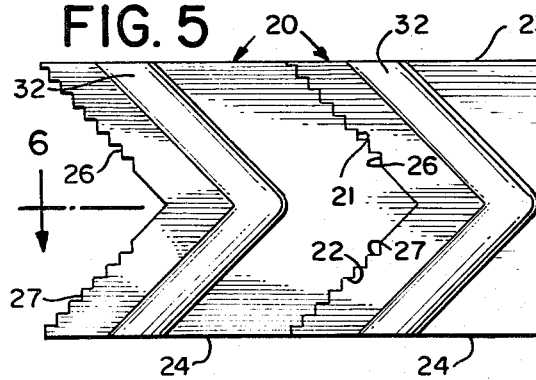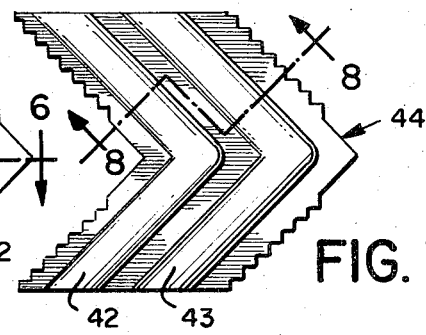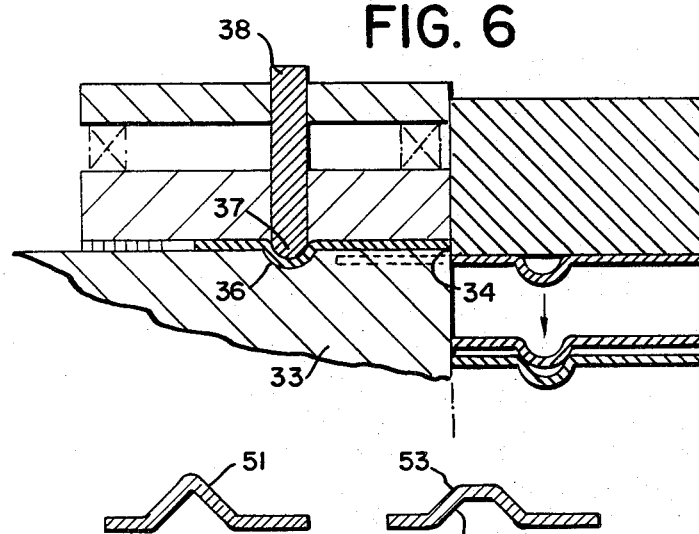

PATENTED AUG 13 1974 3,828,401

NON-STAKING CORNER SLUGS FOR JOINING MITRED EXTRUSIONS

This invention relates to corner slugs for securing together mitred extruded shapes of metal, plastic or like materials, such as those employed in forming aluminum storm and screen combination doors and storm windows for example.

BACKGROUND OF THE INVENTION

To secure the component parts of these assemblies in their assembled condition, the extruded sections embracing conventional corner slugs have normally required "staking" — cold flow deformation of small disc-shaped segments of the extrusion into cold forged deformed relationship, gripping the corner slug in its assembled position — performed in stamping press operations.

When stamped "staking" operations are not performed on such conventional corner slugs, the assembled unit of mitred extrusions ordinarily possesses inadequate strength and rigidity. For this reason, screen frames and similar rectangular frame shapes formed of commercially available extrusions assembled by the homeowner using wedged corner slugs often provide an extremely limited useful life and suffer quick deterioration, since they possess no satisfactory degree of rigidity.

SUMMARY OF THE INVENTION

The corner slugs of this invention combine ease of assembly with greatly simplified locking deformation provided by mere flattening of the ridged or beaded corner slugs. While this flattening may be performed in the stamping press, it may also be performed in a homeowner's vise, greatly simplifying the assembly operation. The corner slugs of this invention are stamped serially in "chevron" fashion from a strip of moderately thick metal, 0.050 inches thick for example. The lower perpendicularly V-shaped severing line by which each chevron-shaped corner slug is separated from the strip forms the upper edge of the next succeeding chevron-shaped corner slug. Positioned at a predetermined distance from this severing line, approximately midway across the corner slug, a chevron-shaped bead is formed, preferably having arms parallel to the arms of the V-shaped severing line. This bead is arched concavely upward, tunnel fashion, from one side of the strip to the other across the entire width of the chevron-shaped corner slug, and may have a total arched height of 0.250 inch for example.

Merely by spacing the severing lines at different distances apart, the final "length" of the corner slug, measured along the length of the elongated strip from which it is stamped, may be varied to produce any desired predetermined length, and different shapes of corner slugs may be formed to fit any extrusions to be joined at mitred corners.

Accordingly it is a principal object of the present invention to provide non-staking corner slugs for joining mitred extrusions to form frame corner assemblies.

Another object of the invention is to form non-staking corner slugs of different predetermined "lengths" using the same stamping die for their production.

A further object of the invention is to provide such non-staking corner slugs adapted to secure mitred extruded shapes together in corner assemblies in sturdy, rigid permanent fashion.

Other and more specific objects will be apprent from the features, elements, combinations and operating procedures disclosed in the following detailed description and shown in the drawings.

THE DRAWINGS

FIG. 1 is a top plan view of a stamped corner slug of the present invention.

FIG. 2 is a cross-sectional elevation view of the slug of FIG. 1.

FIG. 3 is a top plan view of another corner slug forming a different embodiment of the invention.

FIG. 4 is a cross-sectional elevation view of the slug of FIG. 3.

FIG. 5 is a top plan view of two identical corner slugs representing still another embodiment of the invention, positioned in their orientation as they are stamped successively from a metal strip.

FIG. 6 is a cross-sectional elevation view of the two corner slugs of FIG. 5.

FIG. 7 is a top plan view of a dual-ribbed corner slug forming a further embodiment of the invention.

FIG. 8 is a cross-sectional elevation view of the dual ribbed corner slug of FIG. 7.

FIGS. 9, 10, 11 and 12 are corresponding cross-sectional elevation views showing different forms of the upwardly arched bead or rib characterizing the corner slugs of the present invention.

GENERAL DESCRIPTION

Figure 8A:
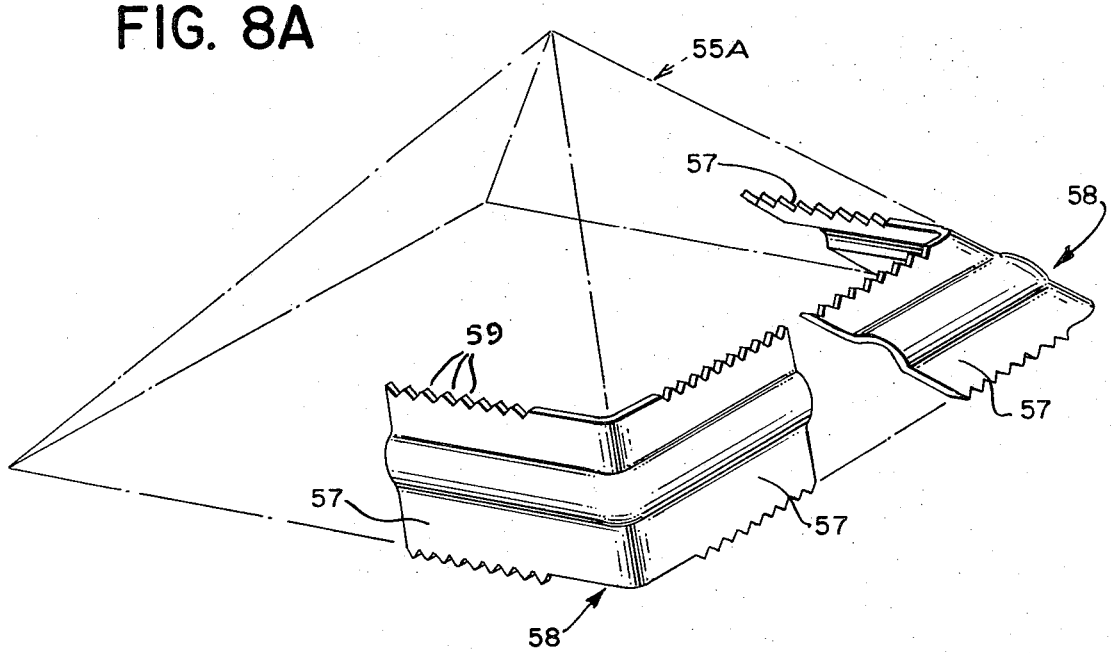
FIG. 8A is a schematic view of non-coplanar corner slugs each having two arms lying in non-coincident planes.

The corner slugs of the present invention are typified by the stamping illustrated in FIGS. 1 and 2, where a slug 20 is shown to be a chevron-shaped stamping bounded by a perpendicularly V-shaped severing line forming two converging "outer" edges 21 and 22 meeting at a right angle at point 31, by two lateral parallel edges 23 and 24, and by two "inner" diverging edges 26 and 27 formed by the next succeeding V-shaped severing line. Edges 21 and 26 are parallel to each other; edges 22 and 27 are parallel to each other. Consequently, edges 21 and 23 form an included angle of 135°, while edges 23 and 26 form a 45° angle and diverging "inner" edges 26 and 27 meet at the center line of the stamped corner slug 20 at a right angle point 28. Center line 29 extends "lengthwise" from point 28 to the corresponding intersection 31 of "outer" edges 21 and 22, and the center line region of the stamping in the vicinity of line 29 may be called the "apex" of the generally L-shaped or chevron-shaped corner slug 20.

Edges 21, 22, 26 and 27 may be provided with teeth, as shown in the FIGURES, or they may be straight if desired.

A characterizing feature of the corner slugs of this invention is an upwardly arched convex bead or rib extending between and substantially parallel to the sides 21 and 26 from side 23 to center line 29, and thence extending from center line 29 generally parallel to sides 22 and 27, to side 24. Thus, as shown in the cross-sectional views of FIGS. 2, 4, 6 and 8, this upwardly arched bead portion 32 forms a tunnel extending laterally underneath the entire chevron-shaped corner slug.

As shown in FIGS. 9–12 a different shaped bead portion 32A having a greater height and/or a greater width may be formed by utilizing a differently shaped forming die.

Furthermore, as shown in FIGS. 5 and 6, these chevronshaped corner slugs 20 are conveniently formed in a single stamping operation, employing a die 33 having a severing edge 34 and a concave bead forming recess portion 26 cooperating with a raised bead-forming rib 37 on an anvil 38 overlying the strip and aligned with the bead forming recess 36.

After each corner slug is formed by closing the stamping dies 33–38, to bring the severing edge 34 into close proximity to the underlying anvil 38, deforming and stamping the chevron-shaped corner slug 20 in a single press operation, the blank strip 41 is indexed past severing edge 34 by a predetermined distance selected to provide the desired slug length, to bring it into the desired alignment for the stamping of the next chevron-shaped corner slug having the desired center line length along the line 29. By varying the indexed position of the strip, but using the same dies, a different shaped slug 20, with a longer or shorter length of center line 29 may be produced, varying the overall size of the slug 20, from the narrow slug shown in FIG. 3 to the wider slugs shown in FIG. 5, for example.

As shown in FIGS. 7 and 8, two parallel beads 42 and 43 may be formed on the slug 44 if desired, providing a corrugated slug configuration having sturdy strength and rigidity.

FIG. 8A shows a schematic drawing of an imaginary flat square pyramid 55A whose base corners define the non-coplanar arms 57 of two corner slugs 58 formed like those shown in the previous FIGURES, but having their arms 57 lying in non-coincident planes such as the side faces of pyramid 55A to engage the ways of chamfered or beveled mitred extruded sections lying in non-coincident planes.

As shown in FIGS. 9, 10, 11 and 12, the beads may be formed with varying shapes. Thus in FIG. 9, the bead 46 is formed with an arcuate curvature of both its inner and outer surfaces, both of which have the same center of curvature 47. In FIG. 10 a different forming die has been used to create a bead having an arcuate outer surface 48 and a V-shaped notch cross section forming its inner surface 49.

If desired a substantially V-shaped bead 51 may be employed, as shown in FIG. 11, and a widely chamfered, flattened V-shaped notch 52 may form the inner surface of a bead having a generally rounded arcuate external contour 53, as shown in FIG. 12.

Figure 13:
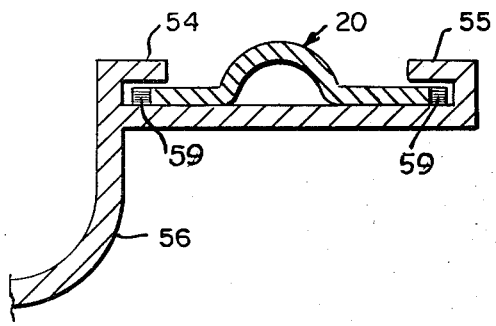
FIG. 13 is a cross-sectional elevation view showing a corner slug of the present invention inserted in the ways of an extruded section ready for installation.

As shown in FIG. 13, the corner slug 20 is first loosely inserted into the ways formed by flanges 54 and 55 of extrusion 56. Then the mitred extruded section 56 is assembled with another corresponding mitred extruded section to be joined together by the corner slug 20. When both extruded sections embracing corner slug 20 are securely held in the corner unit relationship, by a suitable jig for example, corner slug 20 is now flattened, deforming it to the condition shown in FIG. 14, where the bead has been substantially depressed and the material of slug 20 has been forced to flow outwardly toward the flanges 54 and 55, spreading and swaging into tight gripping relationship with these flanges. If teeth 59 are formed on the edges 21, 22, 26 and 27 of the corner slug 20, these teeth are forced to bite into the flanges 54 and 55, embedding themselves to enhance further the swaged gripping relationship between the flattened corner slug 20 and the extruded sections 56.

Figure 14:
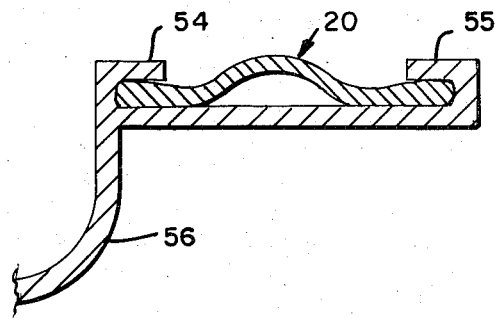
FIG. 14 is a corresponding cross-sectional elevation view of the same corner slug after its bead has been flattened to swage and deform the slug into locking engagement in the ways of the extruded section.

The degree of bead-flattening shown in FIG. 14 is typical of the rather severe flattening deformation preferred near the lateral edges 23 and 24, at the ends of the tunnel-shaped bead 32. For maximum rigidity of the corner assembly, less flattening may be preferred in the apex region near center line 29, leaving a higher arched tunnel or channel-shaped cross-section for slug 20 along line 29 for optimum sturdiness and resistance to deformation.

It will be noted from the foregoing description and all of the figures that no "staking" depressions have been formed in the extruded sections, and that the entire locking assembly of the corner slug and its mitred engaging extrusion sections is achieved through the flattening of the corner slug 20 from its formed shape shown in FIG. 13 to its deformed gripping shape shown in FIG. 14 by flattening force which is preferably concentrated to deform the bead, as shown in FIG. 14.

Accordingly, all need for staking dies and special forming jigs cooperating with stamping press operations are eliminated by this invention. A simple flattening die or even the jaws of an ordinary vise may be used for installing the corner slugs of the present invention to form completed corner assemblies. Accordingly, these corner slugs are simpler to fabricate and far more convenient to install than conventional corner slugs requiring staking installation, and they fill a long felt need in the industry.

Since the foregoing description and drawings are merely illustrative, the scope of the invention has been broadly stated herein and it should be liberally interpreted to secure the benefit of all equivalents to which the invention is fairly entitled.

What is claimed is:

1. A chevron-shaped corner slug having a right-angle L-shaped defined by two perpendicularly V-shaped edge severing lines spaced apart along a center line to provide a predetermined effective length, and characterized by a perpendicularly V-shaped arched convex bead extending between and substantially parallel to the V-shaped severing lines formed of thin deformable metal of substantially uniform thickness, whereby the V-shaped edges may be inserted in groove-shaped ways formed in mitred extrusions, and the bead may then be flattened to spread the edges into gripping, swaging engagement with the ways without requiring staking for secure engagement.

2. The chevron-shaped corner slug defined in claim 1 wherein the arched convex bead forms a concave tunnel extending across the width of the slug.

3. The chevron-shaped corner slug defined in claim 1 wherein the bead is formed with an arcuate convex upper surface.

4. The chevron-shaped corner slug defined in claim 1 wherein the bead is formed with an arcuate concave under surface.

5. The chevron-shaped slug defined in claim 1 wherein the bead is formed with a V-shaped convex upper surface.

6. The chevron-shaped corner slug defined in claim 1 wherein the bead is formed with a V-shaped concave under surface.

7. The chevron-shaped corner slug defined in claim 1 wherein the bead is formed with a chamfered, U-shaped concave under surface.

8. The chevron-shaped corner slug defined in claim 1 adapted to fit extruded section ways lying in non-coincident planes, wherein the corner slug incorporates two arms of said L-shape positioned in non-coincident planes meeting along a longitudinal central axis joining the apices of two V-shaped severing lines.

9. The chevron-shaped corner slug defined in claim 1 incorporating a plurality of beads serially arrayed between the V-shaped severing lines.

10. The method of joining mitred extruded sections having flanged ways formed therein spaced apart by a distance D comprising the steps of
    A. stamping from a metal strip the chevron-shaped corner slug defined in claim 1 by forming two transverse V-shaped severing lines extending across the strip spaced apart lengthwise therealong by a length L less than $\sqrt{2} \times D$,
    B. inserting the corner slug successively into said ways of two oppositely mitred extruded sections while these sections are simultaneously advanced toward each other into abutting corner engagement,
    C. while maintaining said corner engagement, flattening the arched convex bead toward the plane of said V-shaped edges and thereby spreading said edges to force said slug into deformed gripping swaged engagement with said flanged ways.

11. The method defined in claim 10 wherein the bead and the adjacent second V-shaped severing line are formed by a common severing die which simultaneously forms the first V-shaped severing line for the next corner slug stamped from said strip.

12. The method defined in claim 11 wherein the second V-shaped severing line of said corner slug coincides with said first V-shaped severing line of said next corner slug, which then advanced to an indexed severing position for separation from said strip.

13. The method defined in claim 12 wherein the length L is changed to L' by adopting a different spacing between the V-shaped severing lines by changing the indexed severing position of said strip for forming said second severing line, whereby a different size corner slug is formed to fit extruded section ways of widths D' greater than $(1/\sqrt{2}) \times L'$.

14. The method defined in claim 10 wherein said bead is flattened closer to said plane at the ends of said bead than in the central apex region of said chevron-shaped corner slug, whereby the structural rigidity of the assembly of said joined mitred extruded sections is enhanced.

* * * * *